United States Patent [19]

Sakurai

[11] Patent Number: 5,245,657
[45] Date of Patent: Sep. 14, 1993

[54] VERIFICATION METHOD AND APPARATUS

[75] Inventor: Kouici Sakurai, Kamakura, Japan

[73] Assignee: Mitsubishi Denki Kabushiki Kaisha, Japan

[21] Appl. No.: 907,717

[22] Filed: Jul. 2, 1992

[30] Foreign Application Priority Data

Jul. 8, 1991 [JP] Japan .................. 3-166912

[51] Int. Cl.⁵ .............................. H04K 1/00
[52] U.S. Cl. ............................ 380/25; 380/23; 380/30
[58] Field of Search ............... 380/23, 25, 30

[56] References Cited

U.S. PATENT DOCUMENTS 4,193,131  3/1980  Lennon et al. ............... 380/23
4,748,668  5/1988  Adi Shamir et al. .
4,977,595  12/1990  Kazuo Ohta et al. .

FOREIGN PATENT DOCUMENTS 2-266464  2/1990  Japan .

OTHER PUBLICATIONS

Eurocrypt '91 Abstracts, David Chaum & Eugene van Heyst, pp. 130–134.
Proceedings of the Twenty Second Annual ACM Symposium on Theory of Computing, "Witness Indistinquishable & Witness Hiding Protoco".

Primary Examiner—David Cain
Attorney, Agent, or Firm—Wolf, Greenfield & Sacks

[57] ABSTRACT

A prover possessing public information and related secret information sends the public information and an initial message to a verifier. The verifier sends back a random message and an enquiry generated from the initial message and random message. The prover confirms that the enquiry has been correctly generated, then sends the verifier a response created from the enquiry and the secret information and related to the initial message. Using the initial message and public information, the verifier checks whether the response is a valid response to the enquiry. If it is, the verifier stores the public information, initial message, random message, and response as a transcript. If necessary, the transcript can be submitted to an arbitrator to establish that verification has taken place.

49 Claims, 6 Drawing Sheets

VERIFICATION METHOD AND APPARATUS

BACKGROUND OF THE INVENTION

This invention relates to a cryptographic verification system in which a transcript of the verification process provides valid evidence that verification actually took place.

Systems based on secret information are widely used to verify the identity of persons using automatic teller machines, computers, and other facilities. In one well-known system a user (referred to as the prover) presents public information such as a name or account number and secret information such as a password to another party (referred to as the verifier). The verifier checks that the public and secret information match on a list, or transmits the public and secret information to a central authority for checking.

A problem in this simple system is that since the verifier learns the prover's secret information, the verifier can later impersonate the prover. Recently a number of zero-knowledge protocols have been proposed that overcome this problem by enabling the prover to demonstrate that he possesses secret information without actually revealing the secret information. These protocols depend on the intractability of certain calculations, such as extracting square roots modulo a large composite number with unknown prime factors.

Although these zero-knowledge protocols prevent the verifier from impersonating the prover, many of them still suffer from the defect that, even without knowing the prover's secret information, the verifier can forge a credible transcript of a verification process. This has two undesirable consequences: one is that the verifier can defraud the prover; another is that the prover can obtain services from the verifier, then deny that these services were received and claim that the verifier's records of the verification process are forgeries.

A further problem of many zero-knowledge protocols is that the prover can forge a plausible transcript of the verification process. This may also have undesirable consequences, e.g. the prover can defraud the verifier, or the verifier can claim that the prover's records are forgeries and the prover cannot disprove this claim.

SUMMARY OF THE INVENTION

It is accordingly an object of the present invention to prevent the forgoing of verification transcripts.

Another object of the invention is to enable the verifier to prove that verification actually took place.

In the invented verification method, a prover possessing public information ID and related secret information S is linked by a communication line to a verifier. The prover generates an initial message X and sends it to the verifier together with the public information ID.

The verifier generates a random message M and sends the random message M to the prover. The verifier also combines the initial message X and random message M, generates from them an enquiry E, and sends the enquiry E to the prover.

The prover checks that the enquiry E has been correctly generated from X and M. If it has, the prover uses the secret information S to construct a response Y related to the initial message X and the enquiry E, and sends the response Y to the verifier.

The verifier now checks that Y is a valid response to the enquiry E, with reference to the initial message X and public information ID. If Y is valid, the verifier stores a transcript T comprising the public information ID, initial message X, random message M, and response Y. Later, the transcript T can be submitted to an arbitrator as evidence that verification actually took place.

DETAILED DESCRIPTION OF THE INVENTION

Specific methods and apparatus for practicing the invention will be described with reference to the attached drawings. The drawings are presented as illustrations of the invention but they do not restrict the scope of the invention, which should be determined solely from the appended claims.

The invention is practiced under the direction of a trusted center such as a credit company. The trusted center selects and keeps secret two large prime numbers P and Q, and publishes their product N. The numbers P, Q, and N should be large enough that it is computationally infeasible for a person knowing only N to determine P and Q.

The center also publishes a one-way function F that maps arbitrary integers into $Z_N^*$, the set of integers from zero to $N-1$. It will be assumed hereinafter that all names, messages, enquiries, responses, and other information are represented in digital form as strings of binary digits, i.e. as integers expressed in binary notation. The function F can therefore be described as mapping arbitrary information into $Z_N^*$. The one-way property of F means that given an integer J it is feasible to calculate $F(J)$, but not feasible to find a K such that $F(K)=J$. In other words, F is computable but $F^{-1}$ is not.

The center also publishes a hashing function H. A hashing function is a type of one-way function used to compress arbitrary information to a limited number of binary digits (bits). The number of bits generated by the hashing function H will hereinafter be denoted by the letter k. The value of k can be chosen according to the degree of security desired, larger values of k providing greater security. A usable hashing function can be obtained by taking the first k bits of $F(J)$ as $H(J)$, but of course the invention is not limited to this particular hashing function.

When a person applies to become a user of the system, the center constructs for the person an identifier ID such that $F(ID)$ has a square root modulo N; that is, there exists a number S such that:

$$S^2 = F(ID) \bmod N$$

The ID comprises information such as the person's name and credit account number, and possibly padding information added to obtain a certain bit length, or to obtain an ID value such that F(ID) has a square root S.

The center uses its secret knowledge of P and Q to calculate S. N should be large enough that extraction of square roots modulo N without knowledge of P and Q is computationally infeasible.

The center issues this ID to the person as public information, and issues the square root S to the person as secret information. The user stores ID and S in an apparatus that will be referred to as a prover. The prover is, for example, a "smart" credit card with embedded electronic devices.

Figure 1:
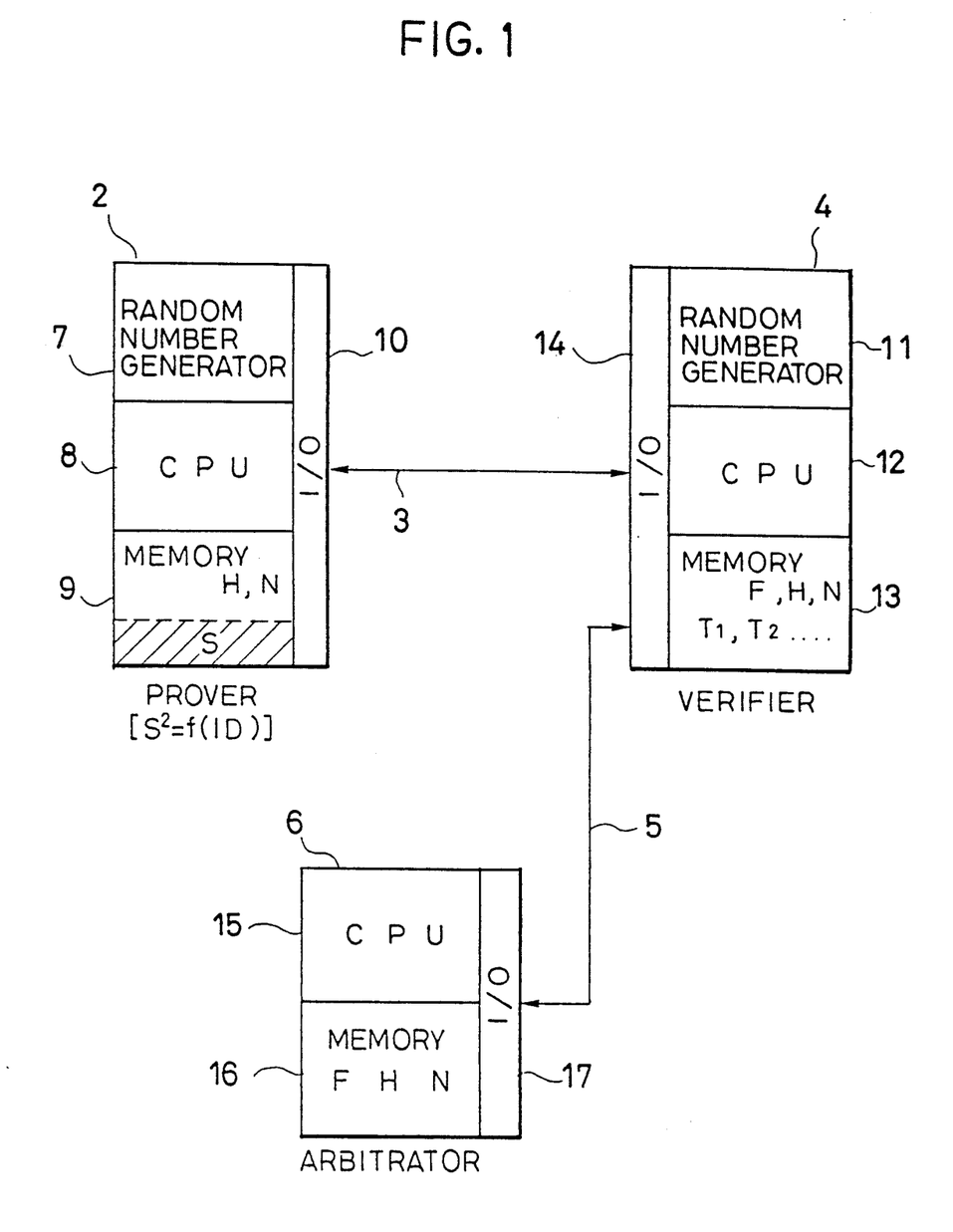
FIG. 1 is a block diagram of the invented verification apparatus.

The prover and other apparatus used in the invention will now be described in more detail. Referring to FIG. 1, the prover 2 is linked by a communication line 3 to a verifier 4 possessed by a party interested in verifying the authenticity of the prover 2. The verifier 4 is linked by a further communication line 5 to an arbitrator 6 that can be used to determine whether verification actually took place.

Although only one prover 2, verifier 4, and arbitrator 6 are shown in the drawing, there will normally be a plurality of these. In a credit card system, for example, each credit card holder has his own prover (a smart credit card), verifiers are installed in stores and other places where credit may be required, and arbitrators are installed in courts for settling disputes. The terms prover, verifier, and arbitrator are often used to refer to the people using the apparatus, but here these terms will be used to denote the apparatus itself.

The prover 2 comprises a random-number generator 7, a central processing unit (CPU) 8, a memory 9, and an input/output port 10. Detailed descriptions of these elements will be omitted since all are well known. The memory 9 contains the integers N, ID, and S, a program for computing the hashing function H, and other programs for controlling the CPU 8. s is preferably stored in a protected memory area that cannot be accessed from outside the prover 2, as indicated by shading in the drawing. The memory also includes temporary storage areas and work areas for performing computations.

The verifier 4 comprises a random-number generator 11, a CPU 12, a memory 13, and an I/O port 14. Detailed descriptions will again be omitted. The memory 13 contains the integer N, programs for computing the one-way function F and hashing function H, other control programs, temporary storage and work areas, and space for storing transcripts $T_1$, $T_2$, ... of verification processes. If the amount of transcript information to be stored exceeds the capacity of the memory 13, transcripts can be temporarily stored in the memory 13 and periodically sent to a central mass storage facility for permanent storage.

The arbitrator 6 comprises a CPU 15, memory 16, and an I/O port 17. The memory 16 contains the integer N, programs for computing F and H, other control programs, and temporary storage and work areas.

The communication lines 3 and 5 may be telecommunication lines or other types of communication lines. Depending on the construction of the prover 2 and verifier 4, the communication line 3 may be replaced by direct physical contact between their I/O ports 10 and 14.

Next a protocol for using the invented system will be described. The protocol will not only demonstrate the prover's authenticity, but also verify that the prover has been used to make a certain request R, such as a request for credit. The steps in the protocol are carried out under control of programs stored in the memories 9 and 13 of the prover 2 and verifier 4.

Figure 2:
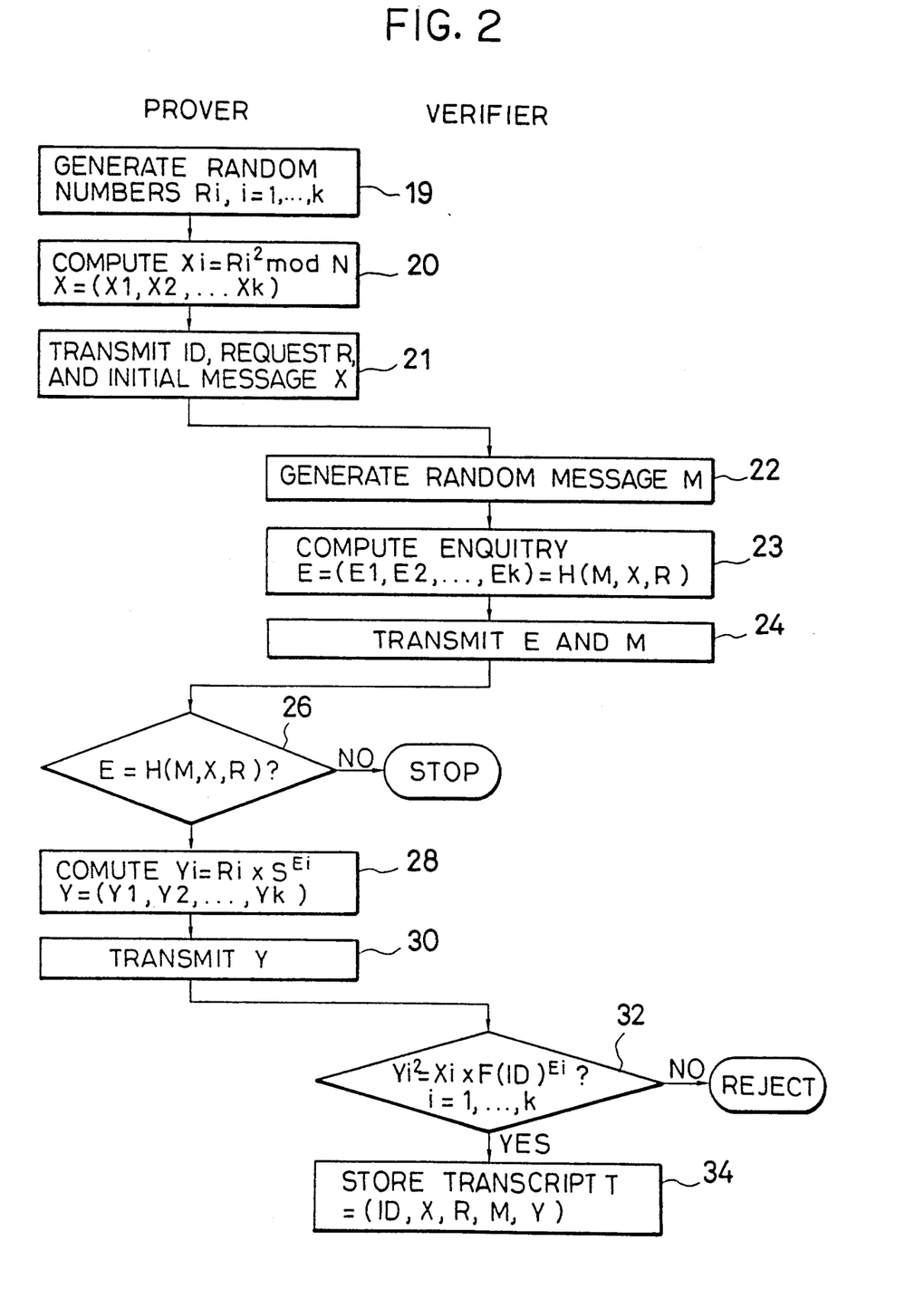
FIG. 2 is a flowchart of a novel verification method.

Referring to FIG. 2, in the first step 19 the random-number generator 7 in the prover 2 is used to generate a set of k random numbers $R_i$ (i=1, ..., k). The value of k is the number of bits produced by the hashing function H, as described earlier. The $R_i$ are stored in the memory 9.

In the next step 20 the CPU 8 in the prover 2 executes a program to compute the squares $X_i$ modulo N of the random numbers $R_i$ (i=1, ..., k). Thus $$X_i = R_i^2 \bmod N \quad (i=1, ..., k).$$

In the next step 21 the prover 2 sends the verifier 4 the public information ID, a request R, and the values of the $X_i$ (i=1, ..., k). The $X_i$ are padded with zero bits as necessary and sent as a single value X comprising k segments of fixed length. X will be referred to below as the initial message. The verifier 4 stores ID, R, and X in its memory 13. X is also stored in the prover's memory 9.

In the next step 22 the verifier 4 uses its random-number generator 11 to generate a random message M, which is stored in the verifier's memory 13.

In the next step 23 the verifier 4 concatenates M, X, and R and hashes them to generate an enquiry E. That is, the CPU 12 in the verifier 4 executes the program for the hashing function H to compute $$E = H(M, X, R).$$

The enquiry E produced by the hashing function H comprises k bits, which will be denoted $E_i$ (i=1, ..., k). Thus $$E = (E_1, E_2, ..., E_k).$$

The enquiry E is stored in the verifier's memory 13. Using the initial message X in generating the enquiry E is a key feature of the invention that makes it impossible for the verifier to forge a transcript, as will be shown later.

In the next step 24 the verifier 4 transmits the enquiry E and random message M to the prover 2, where they are stored in the prover's memory 9.

In the next step 26, the prover 2 executes the program for the hashing function H to check that E=H(M,X,R) and halts the protocol if this relation does not hold. This check is another key feature of the invention. It ensures that the initial message X was correctly received, and prevents the verifier from misrepresenting the request R in the transcript.

In the next step 28, the prover 2 executes a program to compute a set of values $Y_i$ according to the equation $$Y_i = R_i \times S^{E_i} \bmod N \quad (i=1, ..., k)$$

In the next step 30, the prover 2 pads each $Y_i$ with zeros as necessary, concatenates all the $Y_i$ into a single value Y comprising k segments of fixed bit length, and sends Y to the verifier 4 as a response to the enquiry E.

In the next step 32 the verifier 4 executes a program to compute F(ID), extracts the individual values $X_i$ and Yi ($i=1, \ldots, k$) from X and Y, then executes another program to check whether $$Y_i^2 = X_i \times F(ID)^{E_i} \bmod N (i=1, \ldots, k).$$

If the prover 2 has generated the Yi as described above, this relation will hold because $$Y_i^2 = R_i^2 \times S^{2E_i} \bmod N$$

and $R_i^2 = X_i$ while $S^2 = F(ID)$. If this relation fails to hold for any i, the authenticity of the prover 2 is rejected and the request R is refused.

In the last step 34, the verifier 4 stores in its memory 13 the values of ID, X, R, M, and Y as a transcript T of the verification process. Thus $$T = (ID, X, R, M, Y).$$

Next it will be shown that the transcript T cannot be forged without knowledge of the Ri ($i=1, \ldots, k$) and S. Successful forgery entails finding a set of values of Xi, Ei, and Yi satisfying equations 1 and 2 below:

Equation 1:

$$X_i = Y_i^2 / F(ID)^{E_i} \bmod N (i=1, \ldots, k)$$

Equation 2:

$$(E_1, \ldots, E_k) = H(M, X_1, \ldots, X_k, R)$$

Equation 1 can be satisfied by choosing Yi and Ei arbitrarily, then computing Xi. The probability that a set of values obtained in this way will satisfy equation 2, however, is $2^{-k}$, which is substantially nil for large values of k. Moreover, the one-way nature of the hashing function H makes it infeasible to compute a solution to both equations by substituting equation 1 into equation 2. A would-be forger can only resort to trial and error, but if k is sufficiently large, trial and error becomes impractically time-consuming and expensive and the possibility of successful forgery can be safely discounted.

Similar reasoning shows that the probability of successfully deceiving the verifier 4 during the verification process is $2^{-k}$. In this case the deceiver would-be would have to get equation 1 right by correctly guessing k bit values $E_1, \ldots, E_k$ before knowing the random message M.

Next the procedure for establishing the validity of the transcript T will be described. This procedure can be used to settle disputes as to whether the verification described in FIG. 2 actually took place.

Figure 3:
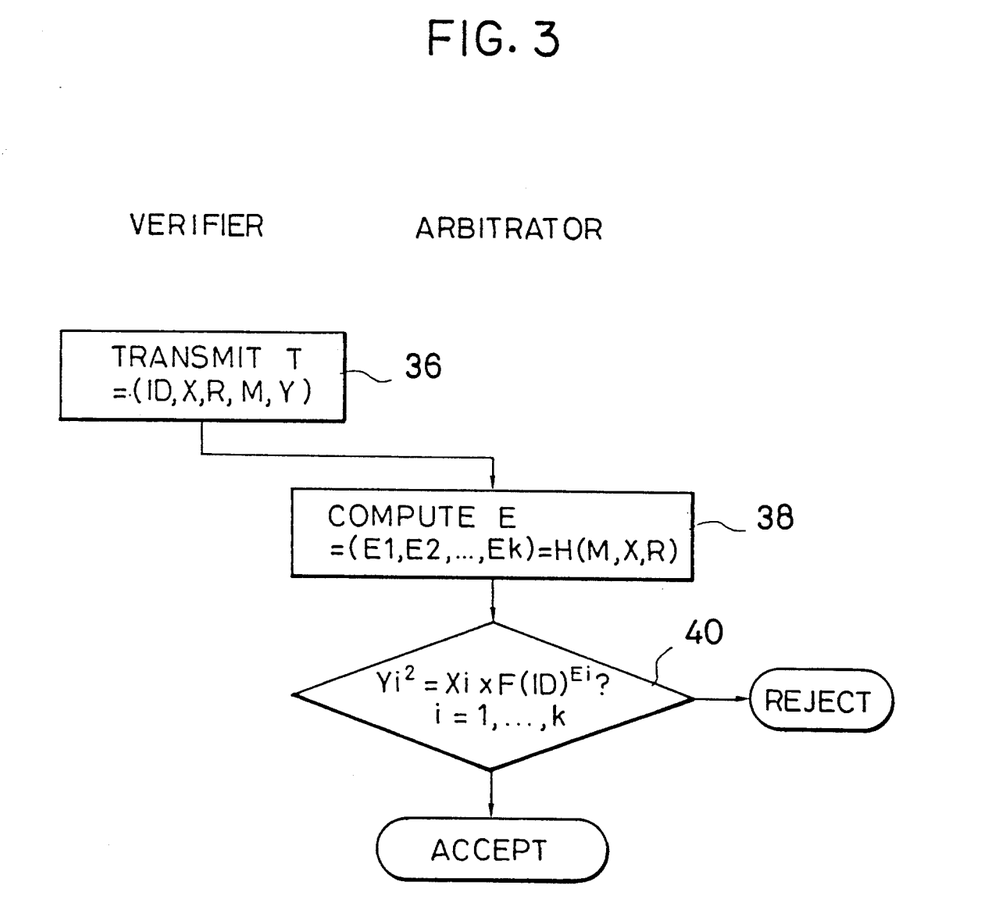
FIG. 3 is a flowchart of a novel process for demonstrating the validity of the transcript produced in FIG. 2.

Referring to FIG. 3, in the first step 36 the transcript T is sent via the communication line 5 from the verifier 4 to the arbitrator 6. The values of ID, X, R, M, and Y are obtained from the transcript T and stored in the memory 16 of the arbitrator 6.

In the next step 38 the arbitrator 6 executes the hashing program to compute E:

$$E = (E_1, E_2, \ldots, E_k) = H(M, X, R)$$

In the next step 40 the arbitrator 6 executes a program to compute F(ID), extracts the individual values Xi and Yi ($i=1, \ldots, k$) from X and Y, and executes another program to check whether $$Y_i^2 = X_i \times F(ID)^{E_i} \bmod N (i=1, \ldots, k).$$

If all k of these checks pass, T is accepted as an authentic transcript. If any of these checks fails, T is rejected as false.

As shown earlier, the probability of successfully deceiving the arbitrator 6 with a forged transcript is only $2^{-k}$. This is also the probability that a false prover 2 can deceive the verifier 4. If k is sufficiently large, the invented system can be made capable of distinguishing between genuine and false provers, and between genuine and false transcripts, with any desired degree of reliability. Moreover, since the transcript T contains a record of the request R, it not only establishes that the verification process took place but also provides evidence of the content of the request for which the verification was carried out. A person cannot request and receive a large amount of credit, for example, then claim later that he requested only a small amount. Here too the probability of successful deception is $2^{-k}$.

If no request is made other than for verification of the authenticity of the prover 2, or if a request is made but evidence of it will not be required later, R can be omitted from the procedures above. In this case the prover 2 begins by sending the verifier 4 only the public information ID and initial message X, the verifier 4 and the arbitrator 6 compute the enquiry as $E = H(M, X)$, and the transcript T comprises only ID, X, M, and Y.

In the protocol described above, although transcripts cannot be forged by the verifier, there is nothing to prevent forgery of transcripts by the prover. In many application, protection against this type of forgery is unnecessary. A credit company, for example, is not at risk from customers who attempt to add unrequested charges to their own credit bills. If protection against such forgeries is desired, however, it can be added by providing the verifier 4 with a digital signature function.

A digital signature function is a function D that only one party can compute, but that anyone can check. Given an integer K, that is, only the owner of the digital signature can compute $J = D(K)$, but given integers J and K, anyone can check whether $J = D(K)$ is true. The integer J will be referred to hereinafter as a signature. Various digital signature schemes are known from the prior cryptographic art. When a digital signature D is added to the invention, a program for computing D is stored in the memory 13 of the verifier 4, and programs for checking D are stored in the memories 9 and 16 of the prover 2 and the arbitrator 6.

Figure 4:
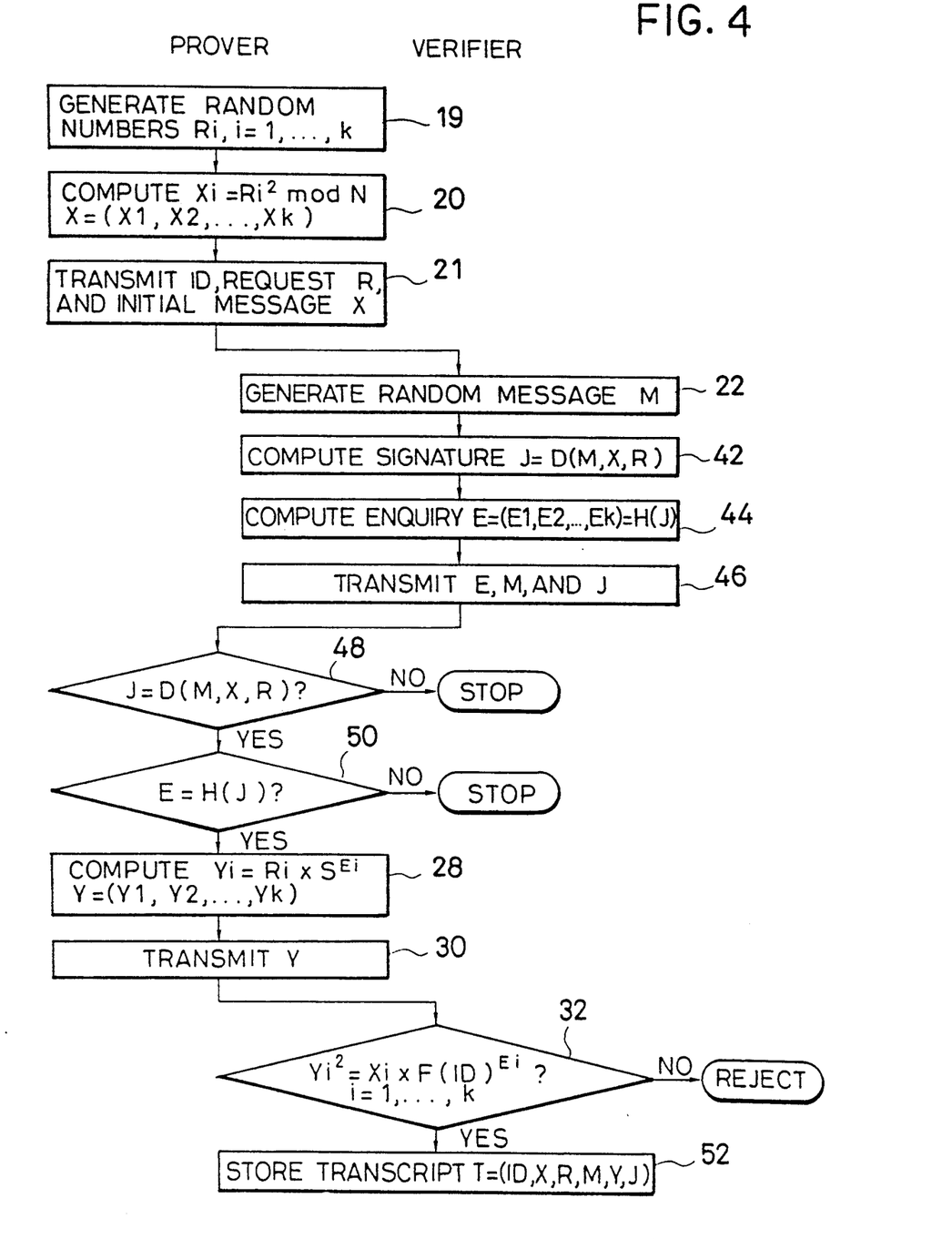
FIG. 4 is a flowchart of another novel verification method.

Referring to FIG. 4, the verification protocol is now as follows. The first four steps 19, 20, 21, and 22 are the same as in FIG. 2: the prover 2 generates random numbers Ri, computes Xi, and sends ID, R, and X to the verifier 4, whereupon the verifier 4 generates a random message M.

In the next step 42 the verifier 4 concatenates the random message M, initial message X, and request R and executes the program for computing the digital signature function D to obtain a signature J, where $$J = D(M, X, R).$$

In the next step 44 the verifier 4 applies the hashing function H to the signature J to obtain an enquiry E, where $$E = H(J).$$

In the next step 46 the verifier 4 sends the enquiry E, random message M, and signature J to the prover 2.

In the next step 48 the prover 2 executes a program to check the validity of J=D(M,X,R), and halts the verification protocol if this relation is not true. As explained above, this program is only able to check the validity of the given signature J; it cannot compute J from M, X, and R.

In the next step 50 the prover 2 executes the program for the hashing function H, checks whether E=H(J), and halts the verification protocol if it does not.

The next steps 28, 30, and 32 in which the Yi values are calculated in the prover 2, sent to the verifier 4, and checked in the verifier 4, are the same as in FIG. 2.

In the last step 52, the verifier 4 stores ID, X, R, M, Y, and J in the memory 13 as a transcript T of the verification process. Thus

T=(ID,X,R,M,Y,J).

Figure 5:
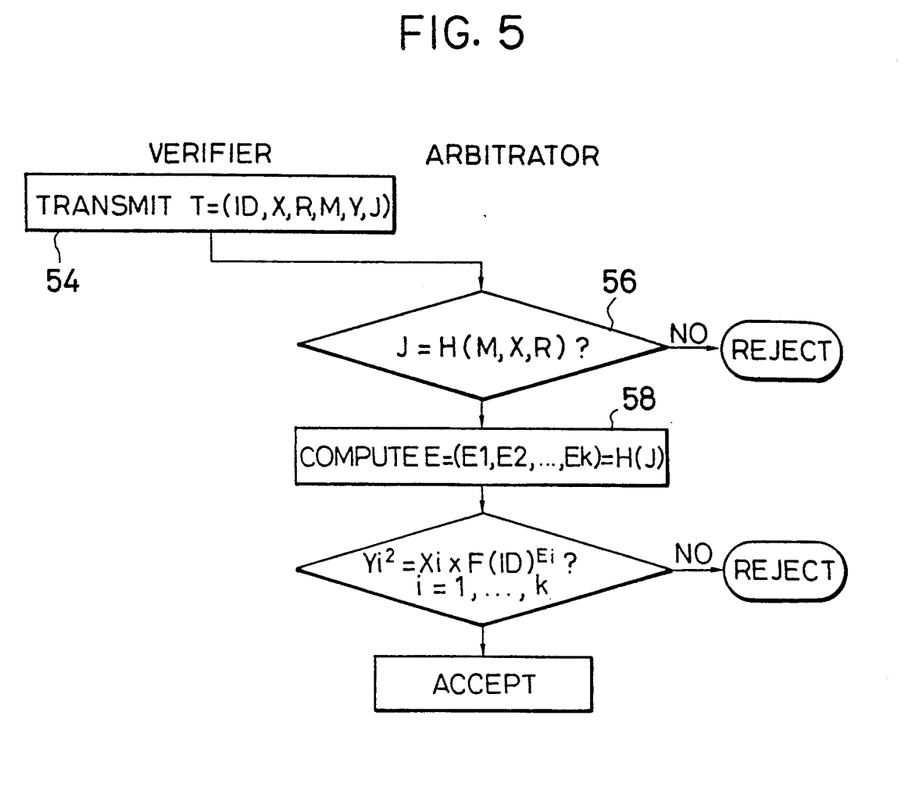
FIG. 5 is a flowchart of a novel process for demonstrating the validity of the transcript produced in FIG. 4.

Referring to FIG. 5, the process for checking the validity of the transcript T is now as follows. In the first step 54, the verifier 4 sends the transcript T to the arbitrator 6.

In the next step 56 the arbitrator 6 extracts the values of J, X, M, and R from the transcript T and executes a program to check the validity of J=D(M,X,R). If this relation is invalid, the transcript is rejected as false.

In the next step 58 the arbitrator 6 computes E=H(J), where E=(E1,E2, ... , Ek). The final step 40 is the same as in FIG. 3.

The transcript T=(ID,X,R,M,Y,J) in FIGS. 4 and 5 cannot be forged by either party in the verification process. The verifier cannot produce a successful forgery for the reason given previously: inability to compute values of X, R, M, and Y satisfying equations 1 and 2. The prover cannot produce a successful forgery because of inability to compute the signature value J. The transcript T is thus safe from forgery by either party.

If the request R is not needed, it can be omitted as before. In this case the signature J is computed as D(M,X), and steps 44, 48, and 52 in FIG. 4 and step 56 in FIG. 5 are modified accordingly.

Figure 6:
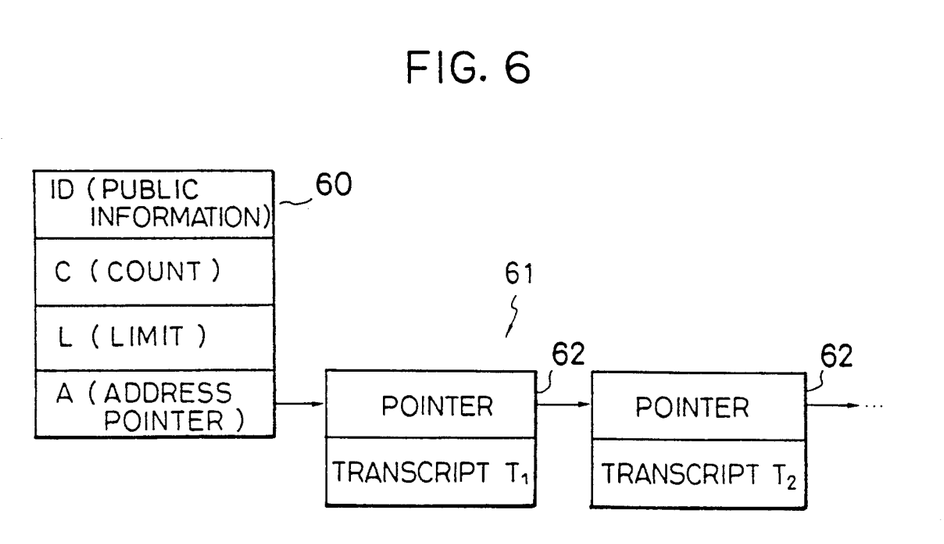
FIG. 6 illustrates the storage of a control block and chain of transcripts.

Security from forgery makes the present invention particularly advantageous in systems that control the number of times the same prover 2 is verified by the verifier 4. Referring to FIG. 6, in such a system the verifier 4 stores in its memory 13 a control block 60 comprising the prover's identifier ID, a count value C, a limit count L, and an address pointer A. A separate control block 60 is stored for each prover 2 verified by the verifier 4. The address pointer A points to a chain of transcripts 61 comprising transcripts $T_1$, $T_2$, ... of verifications of the particular prover 2. Each transcript is stored together with a pointer 62 to the next transcript in the chain.

The count value C indicates the number of times this prover 2 has been verified so far. If the prover 2 has never been verified, the value of C is zero.

Figure 7:
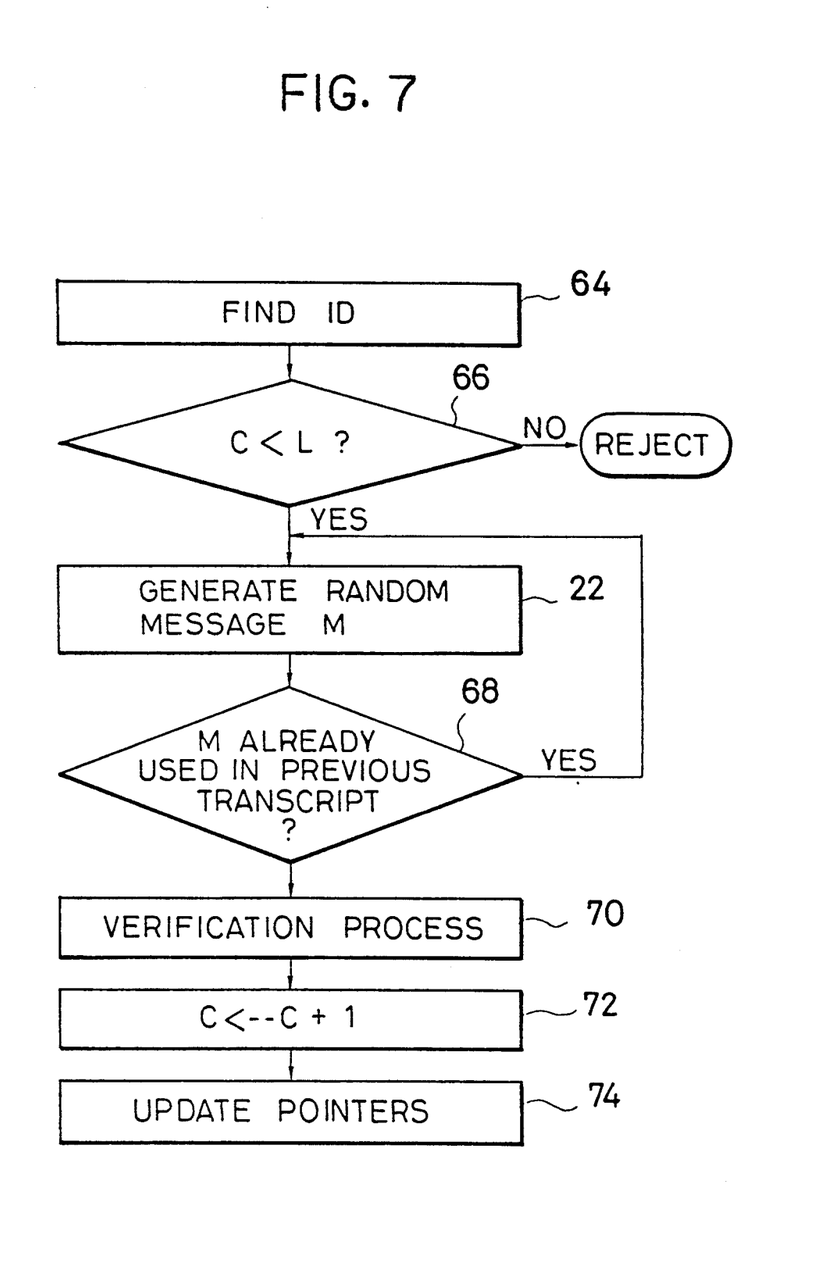
FIG. 7 illustrates a scheme for controlling the number of times verification is performed.

Referring to FIG. 7, the verification protocol now comprises several additional steps that are performed in the verifier 4. In the first additional step 64, after receiving the request R, initial message X, and identifier ID from the prover 2, the verifier 4 locates the control block 60 containing the prover's ID.

In the next step 66, the verifier 4 checks whether the count C is less than the limit L. If it is not, the verifier 4 rejects the prover's request and returns a notification that the limit L has been reached.

In the next step 22 the verifier 4 generates a random message M. This step is the same as in FIGS. 2 and 4.

In the next step 68 the verifier 4 searches the chain of transcripts 61 in FIG. 6 and checks whether the same random message M appears in any previous transcript therein. If an identical random message M is found, the verifier 4 returns to the previous step 22 and generates another random message M. The new random message M is then checked in the same way in step 68. This process is repeated as often as necessary until a random message M is obtained that does not match the random message in any previous transcript for the same identifier ID.

In the next step 70 the verifier 4 verifies the prover 2 by the same procedure as in FIG. 2 or 4. That is, step 70 comprises the steps from the step 23 of computing the enquiry E to the step 32 checking the Yi in FIG. 2, or the steps from the step 42 of computing a signature J to the step 32 of checking the Yi in FIG. 4.

After the prover 2 has been verified, in the next step 72 the verifier 4 increments the count value C.

In the final step 74 the verifier 4 stores the new transcript T in the memory 13 and adds it to the existing chain of transcripts 61 by updating the pointers 62 in FIG. 6.

In step 66, if the verifier 4 asserts that the prover 2 has already reached the limit count L, the user of the prover 2 may protest that this is not so. In that case the verifier 4 can send the arbitrator 6 the entire chain of transcripts 61 in FIG. 6, comprising records of L different verification processes. The arbitrator 6 can validate each transcript by the procedure in FIG. 3 or FIG. 5. Since each transcript has a different random message M, this will establish beyond doubt that the prover 2 has been verified L times.

The scheme in FIGS. 6 and 7 can be modified in various obvious ways. For example, instead of maintaining a count value C, the verifier 4 can simply count the transcripts as it searches the chain 61 for a matching random message, and halt the protocol if the limit L is reached.

Although reference has been made in the preceding description to a credit-card system, the invention is not limited to this particular application; it is useful in many other applications as well. Nor is the invention restricted to the protocols described in FIGS. 2 to 7. Some examples of other protocols in which the invention can be applied will be mentioned next.

For example, the inventive concept of generating the verifier's enquiry E not simply from the random message M but also from the prover's initial message X, and checking that E was correctly generated (steps 23 to 26 in FIG. 2, or steps 42 to 50 in FIG. 4) can be added to various protocols that have been described by Okamoto and Ohta: the extended Fiat-Shamir protocol given in Technical Papers of the Institute of Electronics, Information, and Communication Engineers of Japan, ISEC88-13; schemes 3.3 and 4 given in "How to utilize the randomness of zero-knowledge proofs," Crypto 90; and the message verification scheme disclosed in Japanese Patent Application Kokai Publication No. 266464/1990. In this case the inventive concept provides a solution to the problem of zero-knowledge transferability pointed out by Okamoto and Ohta in a paper on the abuses of zero-knowledge proofs and their countermeasures and applications presented at the 1988

Encryption and Information Security Symposium Workshop, and by Desmedt et al. in "Special Uses and Abuses of the Fiat-Shamir Passport Protocol," Crypto '87, 1987.

The same inventive concept can also be applied to schemes that use discrete logarithms instead of modular square roots, such as the scheme described by Tompa and Woll in "Random Self-Reducibility and Zero Knowledge Interactive Proofs of Possession of Information," IEEE Annual Symposium on Foundations of Computer Science, 1987, pp. 472–482.

Still other types of secret information can be employed as well, and further modifications that will be apparent to those skilled in the art can be made without departing from the spirit and scope of the present invention as set forth in the following claims.

What is claimed is:

1. A method of verifying a prover possessing public information ID and related secret information S, comprising the steps of:
   (a) linking said prover to a verifier by a communication line;
   (b) generating, in said prover, an initial message X;
   (c) transmitting said public information ID and said initial message X from said prover to said verifier;
   (d) generating, in said verifier, a random message M;
   (e) generating, in said verifier, an enquiry E by application of a function relating said enquiry E to said initial message X and said random message M;
   (f) transmitting said enquiry E and said random message M from said verifier to said prover;
   (g) checking, in said prover, that said enquiry E has been correctly generated from said initial message X and said random message M;
   (h) generating, in said prover, a response Y by application of a function relating said response to said enquiry E, said secret information S related to said public information ID and said function having a known mathematical relationship to said initial message X;
   (i) transmitting said response Y from said prover to said verifier;
   (j) checking, in said verifier, whether said response Y was validly generated by computing a function of said enquiry E, said initial message X, and said public information ID; and
   (k) storing, in said verifier, a transcript T comprising said public information ID, said initial message X, said random message M, and said response Y.

2. The method of claim 1, wherein said public information ID, said secret information S, said initial message X, said random message M, said enquiry E, and said response Y are represented as integers in binary notation.

3. The method of claim 2, wherein computations are performed modulo a public composite number N with prime factors P and Q not known to either the prover or the verifier.

4. The method of claim 3, wherein said public information ID and said secret information S are related by a public one-way function F, and $S^2 = F(ID)$ modulo N.

5. The method of claim 4, wherein said step (b) comprises further steps of:
   (b1) generating k random numbers $R1, \ldots, Rk$, where k is a certain positive integer;
   (b2) computing squares $X1, \ldots, Xk$ of respective random numbers $R1, \ldots, Rk$ modulo N; and
   (b3) concatenating said squares $X1, \ldots, Xk$ to form said initial message X.

6. The method of claim 5, wherein said enquiry E comprises k binary digits $E1, \ldots, Ek$.

7. The method of claim 6, wherein said binary digits $E1, \ldots, Ek$ are generated by using a public hashing function H to hash said random message M and said initial message X.

8. The method of claim 6, wherein said binary digits $E1, \ldots, Ek$ are generated by:
   using a digital signature function D to generate a signature J from said random message M and said initial message X; and
   using a public hashing function H to generate said binary digits $E1, \ldots, Ek$ from said signature J.

9. The method of claim 8, wherein:
   said signature J is also transmitted to said prover in said step (f); and
   said prover checks that said signature J has been correctly generated from said random message M and said initial message X in said step (g).

10. The method of claim 8, wherein said signature J is also stored as part of said transcript T in said step (k).

11. The method of claim 6, wherein said response Y comprises integers $Y1, \ldots, Yk$ and each Yi is equal to $Ri \times S^{Ei}$ modulo N, for $i = 1, \ldots, k$.

12. The method of claim 11, wherein said verifier checks whether said response Y is valid in step (k) by checking whether $Yi^2 = Xi \times F(ID)^{Ei}$ for $i = 1, \ldots, k$.

13. The method of claim 1, wherein:
   said prover also transmits a request R to said verifier in said step (c);
   said verifier uses said request R in generating said enquiry E in said step (e);
   said prover uses said request R in checking said enquiry E in said step (g); and
   said verifier stores said request R as part of said transcript T in said step (k).

14. The method of claim 1, wherein, in step (k), said verifier generates a random message M that does not appear together with said public information ID in any previously stored transcript.

15. The method of claim 14, wherein said verifier refuses to verify said prover more than a certain number of times.

16. A method of establishing validity of the transcript T stored in the verifier of claim 1, comprising the steps of:
   (l) linking the verifier to an arbitrator by a communication line;
   (m) transmitting said transcript T from said verifier to said arbitrator;
   (n) generating, in said arbitrator, the enquiry E of claim 1;
   (o) checking, in said arbitrator, whether the response Y of claim 1 is valid according to the enquiry E of claim 1, the initial message X of claim 1, and the public information ID of claim 1.

17. The method of claim 16, wherein said transcript T also comprises a signature J obtained by applying a digital signature function D to said random message M and said initial message X.

18. The method of claim 17, also comprising a step of checking, in said arbitrator, whether said signature J is valid.

19. Proving apparatus, comprising:
   a central processing unit for executing programs;

a random-number generator coupled to said central processing unit, for generating random numbers;

an I/O port coupled to said central processing unit, for transmitting public information ID and an initial message X, receiving an enquiry E and a random message M, then transmitting a response Y; and a memory coupled to said central processing unit, for storing public information ID and secret information S, said memory further containing a first program for using said random numbers to generate said initial message X, a second program for checking whether said enquiry E is related to said initial message X and said random message M according to a predetermined function, and a third program for generating said response Y as a predetermined function of said random numbers, said public information ID, and said secret information S.

20. The apparatus of claim 19, wherein said secret information S is stored in a protected part of said memory that cannot be accessed externally.

21. The apparatus of claim 19, wherein said memory also stores an integer N having secret prime factors.

22. The apparatus of claim 21, wherein said first program generates said initial message X by squaring said random numbers modulo N.

23. The apparatus of claim 19, wherein said second program applies a public hashing function to said initial message X and said random message M.

24. The apparatus of claim 21, wherein said third program multiplies said random numbers by said secret information S raised to exponents equal to individual bits of said enquiry E, multiplication being performed modulo N.

25. The apparatus of claim 19, wherein said I/O port also transmits a request R, and said second program checks said enquiry E according to said initial message X, said request R, and said random message M.

26. The apparatus of claim 19, wherein said I/O port also receives a signature J and said memory stores a fourth program for checking said signature J according to said initial message X and said random message M.

27. The apparatus of claim 26, wherein said second program checks said enquiry E according to said signature J.

28. The apparatus of claim 19, wherein said I/O port also transmits a request R and receives a signature J, and said memory stores a fourth program for checking said signature J according to said initial message X, said request R, and said random message M.

29. The apparatus of claim 28, wherein said second program checks said enquiry E according to said signature J.

30. Verifying apparatus, comprising:

a central processing unit for executing programs;
a random-number generator coupled to said central processing unit, for generating random numbers;
an I/O port coupled to said central processing unit, for receiving public information ID and an initial message X, transmitting an enquiry E and a random message M, and receiving a response Y; and
a memory coupled to said central processing unit, for storing at least one transcript, said memory further containing a first program for using said random-number generator to generate said random message M, a second program for generating said enquiry E as a function of said initial message X and said random message M, and a third program for checking whether said response Y is related to said public information ID, said initial message X, and said enquiry E according to a predetermined function.

31. The verifying apparatus of claim 30, wherein said transcript comprises said public information ID, said initial message X, said random message M, and said response Y.

32. The apparatus of claim 30, wherein said second program generates said enquiry E by applying a public hashing function to said initial message X and said random message M.

33. The apparatus of claim 30, wherein said enquiry E comprises k bits E1, ..., Ek where k is a certain positive integer.

34. The apparatus of claim 33, wherein said memory also stores an integer N having secret prime factors.

35. The apparatus of claim 34, wherein said third program extracts k values X1, ..., Xk from said initial message X, extracts k values Y1, ..., Yk from said response Y, applies a public one-way function F to said public information ID, and checks whether $$Yi^2 = Xi \times F(ID)^{Ei} \bmod N$$

for i = 1, ..., k.

36. The apparatus of claim 30, wherein said I/O port also receives a request R, and said second program generates said enquiry E from said initial message X, said request R, and said random message M.

37. The apparatus of claim 30, wherein said I/O port also transmits a signature J and said memory also stores a fourth program for generating said signature J from said initial message X and said random message M.

38. The apparatus of claim 37, wherein said second program generates said enquiry E from said signature J.

39. The apparatus of claim 30, wherein said I/O port also receives a request R and transmits a signature J, and said memory also stores a fourth program for generating said signature J from said initial message X, said request R, and said random message M.

40. The apparatus of claim 39, wherein said second program generates said enquiry E from said signature J.

41. Arbitration apparatus comprising:

a central processing unit for executing programs;
an I/O port coupled to said central processing unit, for receiving a transcript comprising public information ID, an initial message X, a random message M, and a response Y; and
a memory coupled to said central processing unit, said memory containing a first program for generating an enquiry E according to a predetermined function of said initial message X and said random message M, and a second program for checking whether said response Y is generated according to a predetermined function of said public information ID, said initial message X, and said enquiry E.

42. The apparatus of claim 41, wherein said enquiry E comprises k bits E1, ..., Ek where k is a certain positive integer.

43. The apparatus of claim 42, wherein said memory also stores an integer N with secret prime factors.

44. The apparatus of claim 43, wherein said second program extracts k values X1, ..., Xk from said initial message X, extracts k values Y1, ..., Yk from said response Y, applies a public one-way function F to said public information ID, and checks whether $$Yi^2 = Xi \times F(ID)^{Ei} \bmod N$$

for i=1, ..., k.

45. The apparatus of claim 41, wherein said transcript also comprises a request R, and said first program generates said enquiry E from said initial message X, said request R, and said random message M.

46. The apparatus of claim 41, wherein said transcript also comprises a signature J and said memory also stores a third program for checking said signature J according to said initial message X and said random message M.

47. The apparatus of claim 46, wherein said first program generates said enquiry E from said signature J.

48. The apparatus of claim 41, wherein said transcript also comprises a request R and a signature J, and said memory also stores a third program for checking said signature J according to said initial message X, said request R, and said random message M.

49. The apparatus of claim 48, wherein said first program generates said enquiry E from said signature J.

* * * * *